Patented Aug. 6, 1940

2,210,771

UNITED STATES PATENT OFFICE

2,210,771

MANUFACTURE OF SHAPED ARTICLES FROM POLYMERIC MATERIALS

James Robertson Myles and Leslie Longmore Bache, Northwich, England, assignors to Imperial Chemical Industries Limited, a corporation of Great Britain No Drawing. Application February 7, 1939, Serial No. 255,166. In Great Britain February 11, 1938

4 Claims. (Cl. 18—54)

This invention relates to the manufacture, from synthetic polymeric material, of films, tubes, threads and similar products.

The polymers used in the practice of this invention are the ethylene polymers obtained by the process described in application Serial Number 123,722, filed February 2, 1937, by Fawcett, Gibson and Perrin, and in application Serial Number 157,810, filed August 6, 1937, by Perrin, Paton and Williams. The process described in the first mentioned application consists in subjecting ethylene to pressures in excess of 500 atmospheres under controlled elevated temperature conditions. This procedure results in various polymers of ethylene, the molecular weight of which varies depending particularly upon the pressure and temperature conditions employed. By using pressures of more than 1000 atmospheres and temperatures of the order of about 200° C., solid polymers of ethylene can be formed. Under these conditions the polymerization reaction takes place smoothly, requiring several hours for completion. Or the more rapid reaction described in the second mentioned application may be used. In this method a definite but small quantity of oxygen which may be as little as 0.01% but preferably 0.03% to 0.10% at 1500 atmospheres, is included in the ethylene treated. The pressures are at least 500 atmospheres and preferably at least 1000 atmospheres and below 3000 atmospheres. The temperatures are between 100° C. and 400° C. and more desirably from 150° C. to 250 C. Thus, as a specific instance of obtaining the ethylene polymer, ethylene containing 0.05% oxygen is compressed in a steel bomb to a total pressure of 1500 atmospheres and heated rapidly to 210° C. whereupon a very rapid change in pressure followed by a slow drop in pressure is observed. After five hours' heating at 210° C. the pressure is released and the product cooled. Under these conditions an 80% yield of the solid polymer, based on the ethylene used, is obtained. These solid ethylene polymers obtained as outlined above melt or soften above about 100° C., usually between 110° C. and 200° C. depending upon the molecular weight of the particular polymer, have a molecular weight in excess of 4000, and are essentially saturated products corresponding in composition substantially to $(CH_2)_x$. They are soluble in xylene at its boiling point and are unaffected by prolonged contact with air at ordinary temperature. These solid polymers as ordinarily prepared show a crystalline structure when subjected to X-ray diffraction analysis.

This invention has as an object an improved process for making films, tubes, threads, and the like from the ethylene polymers described above. A further object is the production of new and useful articles of manufacture. Other objects will appear hereinafter.

We have found that the ethylene polymers may be precipitated from their solutions in hot organic solvents and that this fact may be applied under certain conditions of operation to the economical manufacture of articles of the above mentioned kind. A hot concentrated solution of the polymer in the form of a thin stream of the appropriate cross section is introduced into a liquid miscible with the solvent which is a non-solvent for the polymer.

As a rule the temperature of precipitation should be above 70° C. and below 180° C. Below 70° C. the polymer tends to be precipitated as a powder and not in the desired coherent form. The best results are obtained at 80–100° C. The temperature of precipitation is mainly conditioned by that of the bath of the precipitating liquid, but in practice it is desirable that the solution of the polymer and the bath both be at around the chosen precipitation temperature. Although the temperature of precipitation may be above the melting point of the polymer the material is so viscous that in practice it will retain the form which it is given during the precipitation. Both the solvent and the precipitating liquid should be such that they do not boil at the desired operating temperature. If necessary the operation may be carried out under pressure in order to raise their boiling points.

As solvents may be used benzene and its homologues, tetrahydronaphthalene, decahydronaphthalene, trichlorethylene, high boiling petroleum ether, and, in general, any organic solvent which will give a sufficiently concentrated solution of the polymer. As a rule the concentration of polymer should not be less than about 20 per cent. The higher the concentration (up to the point at which the solution becomes unduly viscous), the more satisfactory appears to be the operation of the process. On the other hand, if the concentration of polymer is below about 20 per cent, difficulty is experienced in obtaining satisfactory products. The solvent is heated to obtain the necessary strength of solution, since the solubility of the polymer in the usual solvent is very small.

The precipitating liquid should be highly miscible with the solvent of the polymer solution and have a low solubility for the polymer at the low working temperature. Examples of suitable liquids include many ethers, alcohols, ketones and esters, e. g. n-butyl ether, anisole, ethyl-isoamyl ether, n-propyl alcohol, n-butyl alcohol, cyclohexanol, ethylene glycol, secondary octyl alcohol, methyl amyl ketone, acetophenone, amyl acetate, methyl oleate, butyl phthalate and methyl succinate. Mixtures of two or more of these liquids may be used.

In the production of threads or fibers, the polymer solution may be extruded through a suitable orifice of the type of a spinneret, projecting below the surface of the precipitant liquid. The extruded or coagulated thread is drawn off at a suitable speed to give the desired thickness, and at the same time this process may be employed to apply a drawing effect whereby the molecules of the polymer are orientated parallel to the direction of the drawing, thus giving added strength and luster to the thread. The thickness may also be regulated by the strength of the polymer solution.

Any residual solvent adhering to the extruded material may be removed simply by a suitably arranged hot air blast or application of partial vacuum. In cases where precipitants of low volatility (such as dibutylphthalate) are employed, it is advantageous first to pass the material through a bath of low boiling solvent such as ethyl ether or petroleum ether.

If desired the single threads may be gathered into bundles or hanks which can be cut to form staple fibers of any desired length, e. g. 2½ inches. The drawing out of the threads may be partly accomplished as described above, and by stretching in bulk a hank of threads the threads may be fully cold drawn prior to cutting into staple fibers. During stretching the molecules become more and more orientated in the direction of pull, and finally complete orientation is obtained when the thread has been extended to about five times its original length. Slivers of the staple fiber may be converted by twisting and pulling operations which are well known in the art of manufacturing textiles into yarn or twist from which fabrics may be woven.

In carrying out the invention we prefer to use polymers of molecular weight of at least 4000, and preferably 6000 or over. The mechanical strength of the products increases with the molecular weight of the polymer employed.

In general the strength of the products may be increased by subjecting them to treatment adapted to produce partial or complete orientation of the molecules in a given direction. In the case of threads or tubes this may be accomplished by drawing as explained above; in the case of films, sheets or ribbons the strengthening treatment may consist in cold rolling, i. e., rolling at a temperature substantially below the softening temperature of the polymer. The maximum increase of strength is obtained when the thickness of the material is reduced to about one-fifth of its original value. If desired, the films, sheets or ribbons produced according to the invention may be polished by subjecting them to slight pressure between two heated highly polished surfaces.

The following examples are illustrative of the methods used in practicing our invention:

*Example I*

In this example is described the production of a single continuous thread of ethylene polymer. A 40 per cent solution in xylene of a polymer of molecular weight about 15,000, maintained at a temperature of 96° C., is extruded under a pressure of about 24" of water through a jet 0.5 mm. diameter into a bath of n-butyl alcohol or a mixture of n-amyl alcohol and butyl phthalate at the same temperature. By means of a reel, the resulting viscous thread is drawn off through the bath and into a warm atmosphere, the speed of drawing being regulated to give a final diameter of 0.015 mm. A length of passage through the bath of 1½" may conveniently be allowed.

The residual solvent and the precipitating liquid adhering to the thread are then removed by washing in a bath of petroleum ether, followed by drying in a current of warm air. The continuous thread so obtained may be increased in strength and reduced in diameter by stretching in the cold.

*Example II*

In this example is described the production of a thin film of ethylene polymer. A solution is prepared as in Example I and is maintained at a temperature of 95° C. The solution is then introduced, suitably by means of a narrow slit, in an even film across the face of a heated revolving drum. The drum dips in a bath of n-propyl alcohol maintained at a temperature of 90° C. As the film of solution passes through the bath, the xylene is taken up by the n-propyl alcohol and a film of polymer is precipitated on the surface of the drum. The film is detached from the drum as it rises out of the bath and is collected upon a reel.

The molecular weights mentioned herein were obtained by the method for determining the molecular weights of polymers of high molecular weight devised by H. Staudinger (see Berichte der deutschen chemischen Ges. 1934, 67B, 1247 et seq.), this method being based upon the measurement of the viscosity of a solution of the polymer in a solvent (tetrahydronaphthalene). As this method may not be susceptible of a high degree of accuracy, the values given in this specification should be in all cases regarded as approximate.

The melting or softening points of the polymers were measured by a 'bell and ring" method in which a film of polymer, supported over a ring, is heated by immersion in a heated non-solvent and a small steel ball is placed over the film. The melting or softening point is taken to be the temperature at which the polymer is so sufficiently soft that the ball passes through the ring. In this connection it is to be noted that the polymer does not melt sharply but changes slowly from a solid to a more or less viscous liquid.

The present method provides a convenient method adapted to the large scale production of films, tubes, threads and similar articles. The present invention is particularly adapted to the production of finer threads, films, and tapes than has heretofore been possible.

The products obtained according to the invention are highly resistant to water and many chemicals. The threads are characterized by strength, elasticity, cohesion and lightness. The films, sheets and ribbons may be used for wrapping and protective purposes in general. The products also have excellent dielectric properties and may be used for electrical insulation.

As many apparently widely different embodiments of this invention may be made without departing from the spirit and scope thereof, it is to be understood that we do not limit ourselves to the specific embodiments thereof except as defined in the appended claims.

We claim:

1. A method for making films, tubes, threads, tapes and the like which comprises introducing a stream of a hot solution of a normally solid ethylene polymer into a precipitating liquid which is miscible with the solvent of said solution and which is a non-solvent for the polymer, said solution and precipitating bath being at a temperature of at least 70° C.

2. A method for making films, tubes, threads, tapes, and the like which comprises introducing a stream of a heated solution of a normally solid ethylene polymer in an organic solvent, said solution containing not less than about 20% of the ethylene polymer, into a heated liquid at elevated temperature, which liquid is miscible with said solvent and which is a substantially non-solvent for the polymer, the temperature of precipitation of the polymer by said liquid being at a temperature of from 70° C. to 180° C.

3. A method of manufacturing threads, films, tubes, tapes, and the like which comprises extruding a solution of a normally solid polymer of ethylene having a molecular weight above 4000 into a liquid which is miscible with the solvent used but is a non-solvent for the ethylene polymer, the extrusion being through an orifice of larger cross section than the product required, the product being drawn out of the liquid at a higher rate than the rate of extrusion whereby the desired size of cross section is obtained, said solution and liquid being at a temperature of at least 70° C.

4. A method of manufacturing staple fibre which comprises extruding a solution of a normally solid polymer of ethylene having a molecular weight above 4000 into a liquid which is miscible with the solvent but is itself a non-solvent for the ethylene polymer, drying the thread so formed, and subjecting it to a tensioning process in the cold whereby the molecules are oriented along the length of the thread, said solution and liquid being at a temperature of at least 70° C.

JAMES ROBERTSON MYLES.
LESLIE L. BACHE.